Patented Jan. 22, 1946

2,393,512

UNITED STATES PATENT OFFICE 2,393,512

POLYVINYL CHLORIDE COMPOSITION

Franklin A. Bent, Berkeley, and Kenneth E. Marple, Oakland, Calif., assignors to Shell Development Company, San Francisco, Calif., a corporation of Delaware No Drawing. Application April 5, 1943, Serial No. 481,942

3 Claims. (Cl. 260—36)

This invention relates to the use of selected organic ethers of glycerine as plasticizers for vinyl resins.

The resistance of polyvinyl chloride to oxidation, organic solvents, acids and alkalis makes it desirable for use in molding, coating and impregnating compositions. Difficulty has been experienced, however, in finding for use as plasticizers compounds which impart sufficient plasticity, flexibility and extensibility to polyvinyl chloride without seriously decreasing its tensile strength, which are compatible with it in the required amounts, and which at the same time do not impair its resistance to light, heat and weathering. For most purposes plasticizers must in addition satisfy the requirements of colorlessness, low volatility and high water-resistance.

The problem of satisfactorily plasticizing polyvinyl chloride is perhaps more difficult than with any other resin. With few exceptions, the substances which act as plasticizers for other resins and cellulose derivatives are either incompatible with polyvinyl chloride or impair its strength. Some substances which are otherwise satisfactory as plasticizers increase the tendency of the resin to discolor.

It is an object of the present invention to provide new plasticizers for polyvinyl chloride. A further object is to provide stable polyvinyl chloride compositions of improved tensile strength and flexibility. Other objects will be apparent from the description given hereinafter.

These objects are accomplished in accordance with the present invention by the use of selected cresylic acid ethers of glycerine as plasticizers for polyvinyl chloride.

It has been found that ethers of glycerol having the general formula

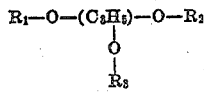

wherein $R_1$ is a cresylic acid radical, $R_2$ is a cresylic acid or fatty acid radical, and $R_3$ is hydrogen or a fatty acid radical, are capable of plasticizing polyvinyl chloride, forming homogeneous compositions of high tensile strength, flexibility and resistance to weathering.

Examples of fatty acid radicals are formyl, acetyl, propionyl, butyryl, valeryl, caproyl, caprylyl, palmityl and stearyl. Of these, those having 2 to 6 carbon atoms are preferred.

As examples of suitable plasticizers may be mentioned: glycerol mono(cresylic acid) ether monoacetate, glycerol mono(cresylic acid) ether diacetate, glycerol mono(cresylic acid) ether mono butyrate, glycerol mono(cresylic acid) ether dibutyrate, glycerol mono(cresylic acid) ether dicaproate, glycerol di(cresylic acid) ether, glycerol di(cresylic acid) ether mono-acetate and glycerol di(cresylic acid) ether mono caproate.

The term "cresylic acid" is used in this application to designate mixtures of monohydric phenols, particularly the cresols, xylenols and higher homologues, which may be derived from coal tar distillates and distillates from the cracking of petroleum. The term is in common use in this sense in the industry.

In one method of obtaining cresylic acid mixtures, cracked petroleum distillate is mixed with caustic soda solution, which extracts the phenols as sodium phenolates. The aqueous phenolate solution, containing some dissolved neutral oil, separates from the distillate by settling. The neutral oils are removed from this phenolate-oil solution by steam distillation, leaving behind the sodium phenolate solution, which is then acidified to free the alkyl phenols. On standing, the latter separate from the aqueous phase as a top layer and are skimmed off. The crude alkyl phenols are then distilled in a vacuum fractionating column into cuts of specified boiling ranges, which may be further purified, if desired. The cuts, which are known as "cresylic acids" and, sometimes, "tar acids," comprise mixtures of alkyl phenols, sometimes with a small amount of unsubstituted phenol. Examples of alkyl phenols occurring in cresylic acids are the following: ortho cresol, meta cresol, para cresol, ortho-ethyl phenol, meta-ethyl phenol, para-ethyl phenol, 2,3-dimethyl phenol, 2,4-dimethyl phenol, 2,5-dimethyl phenol, 2,6-dimethyl phenol, 3,4-dimethyl phenol, 3,5-dimethyl phenol, ortho-isopropyl phenol, 2,3,5-trimethyl phenol, 2,4,6-trimethyl phenol and 2,3,5,6-tetramethyl phenol. The preferred cut from which to form the plasticizers of this invention is that having a boiling range of about 220° C. to about 240° C. This cut contains a larger percentage of xylenols than of cresols, a typical analysis being as follows:

| | Parts |
|---|---|
| Xylenols | 8 |
| $C_3$ alkyl phenols | 45 |
| $C_4$ alkyl phenols | 47 |

The plasticizers of the invention may be formed by the etherification of glycerol with a cresylic acid mixture in the usual manner, followed, in the case of the ether-esters, by esterification. The various radicals may be arranged in any of the several possible positions in the molecule. Thus in the mono(cresylic acid) ethers, the cresylic acid radical may be attached to the alpha or beta carbon atom of the glycerol radical. With the di-ethers, either an alpha and a beta carbon atom, or two alpha carbon atoms, of the glycerol radical may be involved with the cresylic acid radicals. These compounds are mutually structurally isomeric and are all operable in accordance with the invention. As a practical matter, the substances used as plasticizers will usually be mixtures of several, or all, possible isomers.

The following examples, in which parts are based on weight, are given for the purpose of illustrating the invention:

Example I 67 parts of polyvinyl chloride sold as "Vinylite QNYA" were blended by rolling on a heated rubber mill with 33 parts of glycerol di(cresylic acid) ether. A sheet formed by subjecting a portion of the composition to pressure between heated polished metal platens was clear and substantially water-white. The tensile strength was 4775 p. s. i. at 25° C. and 0% relative humidity, as compared to 4077 p. s. i. for polyvinyl chloride plasticized with tricresyl phosphate.

Example II 67 parts of polyvinyl chloride were mixed in a screw mixing machine with 33 parts of glycerol mono(cresylic acid) ether diacetate. The composition was subjected to heat and pressure en masse in a block press of the type used in the cellulose nitrate industry. A sheet sliced from the block exhibited an ultimate elongation of 273% at 25° C. and 0% relative humidity, as compared with only 251% for polyvinyl chloride plasticized with tricresyl phosphate. The composition was clear and colorless.

Example III

A homogeneous composition comprising equal parts of polyvinyl chloride and glycerol di(cresylic acid) ether was adhered to woven cotton fabric by calendering at 110° C. The resulting material was substantially non-tacky, was highly flexible even at temperatures below 0° F. and exhibited excellent impact and abrasion resistance.

Example IV 55 parts of polyvinyl chloride, 22 parts of titanium dioxide, 23 parts of antimony oxide tinted with iron blue, 60 parts of glycerol mono (cresylic acid) ether diacetate and 40 parts of cyclohexanone were mixed to form a homogeneous composition which was applied with the aid of a doctor knife to woven nylon fabric. After drying, the white coated fabric was used in making raincoats.

Example V

A homogeneous blend consisting of 90 parts polyvinyl chloride, 5 parts glycerol mono(cresylic acid) ether diacetate and 5 parts glycerol di(cresylic acid) ether was formed into a sheet in the manner described in Example I. The material had high tensile strength and flexibility.

Example VI

Heavy felt formed from a mixture of wool fibers and cotton fibers was impregnated with a composition comprising 100 parts polyvinyl chloride and 30 parts glycerol mono(cresylic acid) ether diacetate dissolved in mesityl oxide. Upon evaporation of the solvent the material was found suitable for stiffening purposes.

Example VII

Polyvinyl chloride granules plasticized with 50 parts of glycerol di(cresylic acid) ether per 100 parts of polyvinyl chloride were formed by compression molding into a bar 6 inches long, 0.5 inch wide and 0.25 inch thick. The bar could be bent double at below 0° F. without breaking.

Example VIII

A film was formed by casting a solution of 40 parts of polyvinyl chloride, 20 parts glycerol mono(cresylic acid) ether diacetate and 40 parts isophorone upon a glass plate, followed by removal of the solvent. The film was flexible, perfectly clear and substantially colorless. It exhibited an ultimate elongation of 288% at 25° C. and 100% relative humidity, as compared with 256% for a similar film plasticized with tricresyl phosphate. At the end of one year under room conditions the elongation was approximately unchanged.

Tensile strength and ultimate elongation were determined by the standard procedure for the tension testing of vulcanized rubber, A. S. T. M. D412-41, using a Scott tester, Model L-6.

The compositions of the present invention comprise homogeneous mixtures of polyvinyl chloride and selected glycerol(cresylic acid) ethers. The utility of the invention is most apparent with the more difficultly plasticized, acetone-insoluble polyvinyl chlorides of high molecular weight. If desired, small amounts of other resins may be added. The compounds act as plasticizers for the other polyvinyl halides, also.

The plasticizer may be incorporated with the resin by mixing with the monomer prior to polymerization, or it may be conveniently added to the polymer by grinding, mixing or milling, or by the use of hot rolls such as are employed in the rubber industry. Solvents may be used to facilitate blending, particularly where the preparation of coating compositions is involved. There may be added titanium dioxide, carbon black, zinc oxide, barytes, clay, wood flour and other common pigments and fillers, as well as dyes and other modifiers.

The amount of plasticizer used will depend upon the purpose of the composition. Molded articles ordinarily require less plasticizer than coatings on flexible backings, such as fabric. Amounts of the selected glycerol (cresylic acid) ethers as small as 5% by weight of the total composition impart noticeable plasticity thereto. On the other hand, complete compatibility and freedom from exudation characterize compositions in which the plasticizer is present in amounts as great as 75% by weight of the total. For most purposes, however, the plasticizer will vary from about 20% to about 50% by weight of the total.

The selected glycerol(cresylic acid) ethers may be used individually or in admixture with one another, or with small amounts of other plasticizers. It has been found that in the presence of any of the plasticizers of this invention somewhat larger amounts of other substances than are alone compatible with polyvinyl chloride blend completely homogeneously therewith, forming clear compositions of satisfactory strength and flexibility.

Both plasticizers show little tendency to evaporate from the compositions, even over long periods of time. The loss due to volatility in blending on heated equipment is small.

The compositions of the present invention find use in a variety of applications. In granular and pellet form they serve for compression and injection molding, and for continuous extrusion. Their high dielectric strength makes them valuable for insulation for electrical conductors, for transformer coils and as battery grids. Of special importance is their use as coatings resistant to acids, alkalis and organic solvents, particularly where this property of chemical resistance must be combined with high tensile strength, flexibility and abrasion resistance.

We claim as our invention:

1. A homogeneous composition comprising polyvinyl chloride and glyerol di(cresylic acid) ether.

2. A homogeneous composition comprising polyvinyl chloride and glycerol alpha, gamma-di(cresylic acid) ether.

3. A composition comprising a homogeneous mixture of polyvinyl chloride and glycerol di-(cresylic acid) ether containing 20% to 50% by weight of the latter substance.

FRANKLIN A. BENT.
KENNETH E. MARPLE.